United States Patent
Ge et al.

(10) Patent No.: US 9,899,937 B2
(45) Date of Patent: Feb. 20, 2018

(54) PEG-STYLE ELECTROSTATIC ROTATING MACHINE

(71) Applicant: Wisconsin Alumni Research Foundation, Madison, WI (US)

(72) Inventors: Baoyun Ge, Madison, WI (US); Daniel Colin Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 463 days.

(21) Appl. No.: 14/598,411

(22) Filed: Jan. 16, 2015

(65) Prior Publication Data
US 2016/0211775 A1    Jul. 21, 2016

(51) Int. Cl.
  *H02N 1/00* (2006.01)
  *H02N 1/08* (2006.01)

(52) U.S. Cl.
  CPC .............. *H02N 1/006* (2013.01); *H02N 1/004* (2013.01); *H02N 1/08* (2013.01)

(58) Field of Classification Search
  CPC .......... H02N 1/00; H02N 1/004; H02N 1/002; H02N 1/006; H02N 1/008; H02N 1/08
  USPC .......... 310/300, 308–309; 318/116; 361/296, 361/298.1, 298.3, 299.5, 327; 322/2 A
  See application file for complete search history.

(56) References Cited

U.S. PATENT DOCUMENTS

| | | | | |
|---|---|---|---|---|
| 2,009,503 A | * | 7/1935 | Landwerlin | H02N 1/08 310/309 |
| 2,947,926 A | * | 8/1960 | Murch | H01B 3/465 218/150 |
| 3,094,653 A | | 6/1963 | Le May et al. | |
| 3,436,530 A | | 4/1969 | Bollee | |
| 3,629,624 A | * | 12/1971 | Staudte | H02N 1/004 310/309 |
| 3,700,983 A | * | 10/1972 | Goetzl | H01G 5/0138 361/279 |
| 4,953,057 A | * | 8/1990 | Davidian | H01G 5/06 29/25.42 |
| 5,642,015 A | * | 6/1997 | Whitehead | B06B 1/0292 310/309 |
| 6,353,276 B1 | | 3/2002 | Gendron | |
| 8,278,797 B2 | | 10/2012 | Sashida | |
| 8,643,249 B2 | | 2/2014 | Post | |
| 9,270,203 B2 | * | 2/2016 | Post | H02N 1/00 |
| 2014/0175941 A1 | * | 6/2014 | Johnson | H02N 1/006 310/309 |

(Continued)

FOREIGN PATENT DOCUMENTS

| | | | | |
|---|---|---|---|---|
| EP | 2040366 A1 | | 3/2009 | |
| GB | 1080624 | * | 8/1967 | ............ B01D 61/44 |
| GB | 1119336 | * | 7/1968 | ............... H01N 1/08 |

OTHER PUBLICATIONS

D. Albert et al.; Initiation of Eledrical Breakdown in Ultrahigh Vacuum; J. Vac. Sci. Technol., vol. 1, No. 2. Nov. 1964; pp. 35-50; University of Illinois, US.

(Continued)

*Primary Examiner* — Burton Mullins
(74) *Attorney, Agent, or Firm* — Boyle Fredrickson, S.C.

(57) ABSTRACT

An electrostatic rotating electrical machine employs interdigitated axial pegs on opposed rotor and stator plates, the pegs immersed in a high dielectric constant fluid. Peg shape, length and positioning may be varied to tailor a changing aspect profile to a desired power source.

18 Claims, 5 Drawing Sheets

(56) References Cited

U.S. PATENT DOCUMENTS

2014/0232235 A1* 8/2014 Boughtwood ......... H01R 39/30
                                                        310/219

OTHER PUBLICATIONS

Baoyun Ge et al.; Evaluation of Dielectric Fluids for Macro-Scale Electrostatic Actuators and Machinery; Entire Document; Sep. 2014 IEEE Energy Conversion Congress and Exposition (ECCE); Madison, Wisconsin.

* cited by examiner

PEG-STYLE ELECTROSTATIC ROTATING MACHINE

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to rotating electrical machines (e.g., electrical motors and generators) and in particular to a rotating electrical machine employing axially extending interdigitated pegs.

Electrical motors and generators share similar structures of an electrically interacting stator and rotor and may be collectively termed "rotating electrical machines," Conventional rotating electrical machines may be roughly divided into "electromagnetic" devices exploiting magnetic fields and/or change in inductance (reluctance) between moving parts, and "electrostatic" devices exploiting electrical fields and change in capacitance between moving parts.

Electrostatic rotating electrical machines have a number of advantages over conventional electromagnetic rotating electrical machines including the elimination of magnets and costly rare earth materials, significant weight from ferrous materials, and high current copper windings.

Electrostatic machines are commonly found in micro-scale, micro-electromechanical systems (MEMS) which permit extremely small gaps between rotor and stator elements allowing high capacitance and high electrical fields. For larger scale rotating machines, for example, those providing integer horsepower and larger outputs (macro-scale), the physical gap between the stator and rotor may be one to three orders of magnitude larger than that for MEMS machines. This larger gap requires higher applied voltages typically in the tens or even hundreds of thousands of volts for comparable torque. These high voltages normally require ultrahigh vacuum containment vessels to prevent arcing between stator and rotor components.

The simultaneous requirement of minimizing the gap (tolerances) between stator and rotor components and using high voltage driving power can present significant manufacturing challenges in manufacturing macro scale electrostatic motors.

SUMMARY OF THE INVENTION

The present invention provides a versatile design for macro-scale electrostatic motors that simplifies manufacture by eliminating plates in favor of interdigitated pegs immersed in a high dielectric strength, high dielectric constant fluid. The pin-style construction allows increased design flexibility through modification of peg spacing alignment and dimensions, allowing variations in capacitance as a function of rotation to be maximized and closely matched with available driving voltages/currents for improved torque and torque consistency.

Specifically, in one embodiment, the present invention provides an electrostatic machine having a housing and an axle extending along an axis and supported on the housing for rotation about the axis. At least one rotor element is attached to the axle to rotate therewith and to provide a plurality of axially extending rotor pegs. At least one stator element substantially fixed with respect to the housing provides a plurality of axially extending stator pegs moving between the rotor pegs in interdigitated fashion with rotation of the rotor. A high dielectric fluid is held within the housing to surround the rotor pegs and stator pegs, the high dielectric fluid providing a breakdown voltage of at least 5,000 volts per millimeter.

It is thus a feature of at least one embodiment of the invention to eliminate the need for ultrahigh vacuum containment vessels for the rotating machine such as increase the cost and size of the machine while reducing its efficiency through vacuum pump losses.

The high dielectric fluid may also provide a relative permittivity of greater than five.

It is thus a feature of at least one embodiment of the invention to allow relaxed tolerances in the separation between stator and rotor elements necessary for practical manufacture of macro-scale machines. The high relative permittivity provides increased capacitance between rotor and stator elements offsetting the effects of greater separation and lower field strength for a given voltage between these elements.

The stator pegs may include first and second sets of concentric circular rows of pegs, where the pegs of each set are also in radial rows. The rows of the first and second sets are angularly offset with respect to each other. The pegs in each circular row are in electrical communication with other pegs of the given circular rows and isolated from pegs of other circular rows.

It is thus a feature of at least one embodiment of the invention to provide a compact design that permits a rotating electric field and torque smoothing through multiphase excitation.

The rows of the first set of stator pegs may be angularly positioned halfway between the rows of the second set of stator pegs and the electrostatic machine may further include an electrical power supply providing a first and second waveform to the first and second sets respectively where the first and second waveforms are substantially 180 degrees out of phase.

It is thus a feature of at least one embodiment of the invention to provide an electrostatic motor with improved torque consistency that may be readily powered from a single-phase power source using transformer circuitry.

The rotor pegs and stator pegs may have a substantially constant cross-sectional diameter measured in a plane perpendicular to the axis It is thus a feature of at least one embodiment of the invention to provide an electrostatic machine with a capacitance profile (change in capacitance as a function rotor angle) that reduces angular ranges of constant capacitance that result in torque dropout.

The rotor pegs and stator pegs may be configured to provide a varying mutual capacitance whose derivative matches a respective of the first and second waveform providing power to the rotor and stator pegs.

It is thus a feature of at least one embodiment of the invention to maximize energy transfer to the electrostatic machine by coordinating voltage and change in capacitance for maximum torque.

The rotor pegs and stator pegs may be circular in cross-section.

It is thus a feature of at least one embodiment of the invention to provide a readily manufactured peg shape that reduces field concentrations that could promote arcing.

The pegs may be coated with a material with a high dielectric constant of greater than 10.

It is thus a feature of at least one embodiment of the invention to provide an insulator that may also ensure electrical isolation between rotor and stator elements.

At least one of the rotor and stator may be constructed of an insulating substrate with a conductive metal coating.

It is thus a feature of at least one embodiment of the invention to permit lightweight rotor fabrication with complex shapes using techniques such as injection molding.

The stator pegs may include a first, second, and third set of stator pegs in electrical communication with other pegs of a given set and isolated from pegs of other than the given set, wherein the pegs of the first, second, and third sets are arranged at angularly equal periodic spacing about the axis and further including an electrical power supply providing a first, second, and third waveform to the first, second, and third sets respectively where the first, second, third wave forms are substantially 120 degrees out of phase with each other in the manner of three-phase electrical power.

It is thus a feature of at least one embodiment of the invention to permit construction of a three-phase electrostatic motor usable with common electrical power sources.

Each set of rotor pegs may include clusters of multiple angularly spaced rotor pegs.

It is thus a feature of at least one embodiment of the invention to present multiple angularly dispersed pegs in each phase allowing improved tailoring of the capacitance profile.

The rotor pegs within a cluster have a varying axial length among different pegs of the cluster.

It is thus a feature of at least one embodiment of the invention to permit control of the capacitive profile by changing an overlap between rotor and stator pegs.

The electrostatic machine may further include slip rings for providing a direct electrical voltage or current to the rotor pegs.

It is thus a feature of at least one embodiment of the invention to permit the enhancement of torque by the control of electrostatic charge on the rotor.

These particular objects and advantages may apply to only some embodiments falling within the claims and thus do not define the scope of the invention.

DETAILED DESCRIPTION OF THE PREFERRED EMBODIMENT

Figure 1:
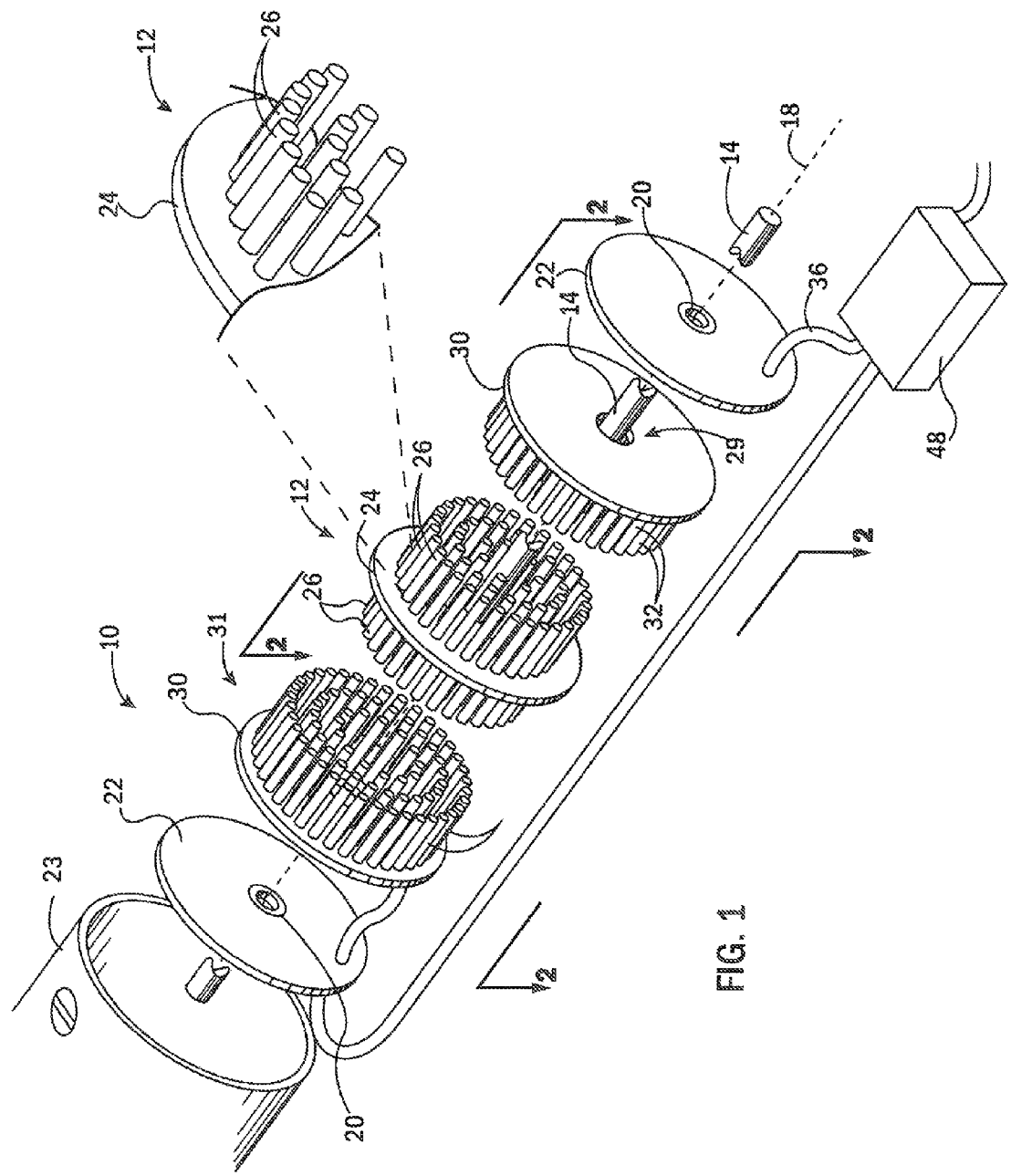
FIG. 1 is an exploded perspective view of one embodiment of the present invention providing overlapping axial pegs extending from rotor and stator elements.

Referring now to FIG. 1, a rotating electrical machine 10 per the present invention may provide a rotor 12 mounted on an axle 14 for rotation about an axis 18. The axle 14 may be supported at opposite ends by bearings 20 in turn held on end plates 22. The axle 14 may pass through one end plate 22 to be attached to other rotating machinery, for example, to provide for a drive torque to that machinery in the manner of a conventional motor or to receive a driving force when the machine 10 is used as a generator.

Figure 2:
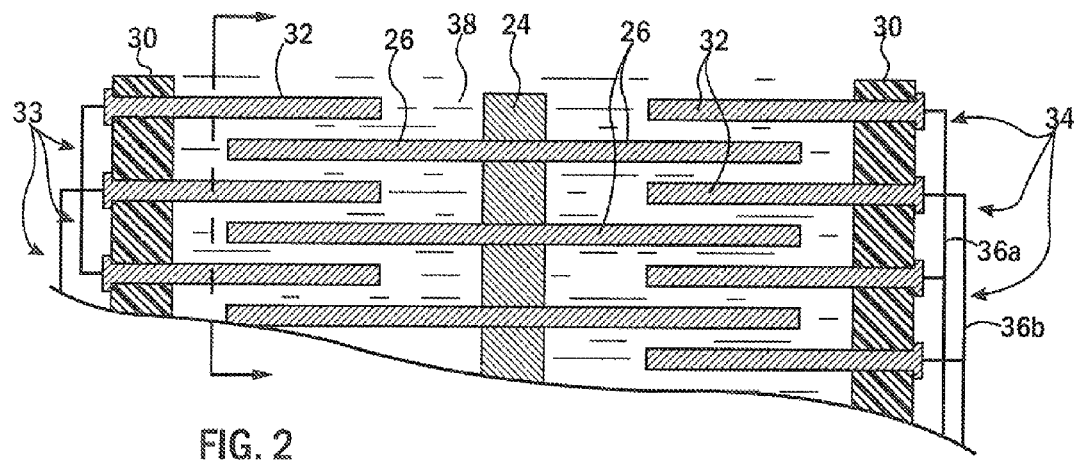
FIG. 2 is a cross-section taken along line 2-2 of FIG. 1 in an unexploded configuration showing overlap of the rotor and stator pegs as immersed in a high dielectric fluid.

Referring also to FIG. 2, rotor 12 may comprise one or more rotor disks 24 extending generally perpendicularly to the axis 18 to rotate with the axle 14. A set of concentrically arranged rotor pegs 26 in constant radius rows 33 may extend from the front and rear surfaces of the rotor disks 24 parallel to the axis 18. Each of the rotor pegs 26 is electrically conducting and may be either insulated from other rotor pegs 26 by insulating rotor disks 24 or electrically joined by a conductive rotor disk 24. In one embodiment the rotor pegs 26 are circular cylinders capped with hemispherical distal ends; however, generally any shape of substantially constant axial cross-section is contemplated and other peg cross-sections may also be used, for example, those offering decreased flow resistance through a fluid.

Flanking each rotor disk 24 along the axis 18 are two stator disks 30 of stators 31 also having axial stator pegs 32 extending inward toward a respective rotor disk 24 of the rotor 12. The stator disks 30 are generally stationary with respect to the housing 23 and may have a central bore 29 allowing free passage of the axle 14 through the stator disks 30 to the bearings 20.

The stator pegs 32 are also arranged circumferentially along constant radius rows 34 fitting between the rows 33 of rotor pegs 26 so that the rotor 12 may rotate without interference between the rotor pegs 26 and stator pegs 32. The stator pegs 32 are also electrically conductive but selectively isolated from each other by an insulating material of the stator disk 30. In a first embodiment, alternate concentric rows 34 of stator pegs 32 are joined to either a first conductor 36a or second conductor 36b as will be described below.

Each rotor disk 24 and the two stator disks 30 form a three-disk element that may be repeated along the axle 14 with the rotor pegs 26 and/or stator pegs 32 and interconnected for parallel or series operation.

The end plates 22 may form part of a housing 23 that together provide an enclosed volume holding the rotor 12 and stator 31 and within which the rotor 12 may rotate. The housing 23 may be filled with a dielectric fluid 38 surrounding the rotor pegs 26 and stator pegs 32 to provide insulation therebetween, preventing arcing or other current flow and increasing the dielectric constant in the gaps between the rotor pegs 26 and stator pegs 32. In one embodiment, the dielectric fluid may be Verterel® XF, a hydrocarbon fluid ($C_5H_2F_{10}$) having a dielectric constant from 7-10, a breakdown strength of 14,000 to 28,000 volts/mm, a volume resistivity (ohm-cm) of $10^9$-$10^{11}$ and a viscosity (cPs) of 0.67. Generally the present invention contemplates a breakdown strength of at least 5000 volts per millimeter and desirably greater than 10,000 volts per millimeter and the dielectric constant of at least five and desirably greater than seven and a viscosity of less than water and desirably less than 70 cPs.

Figure 3:
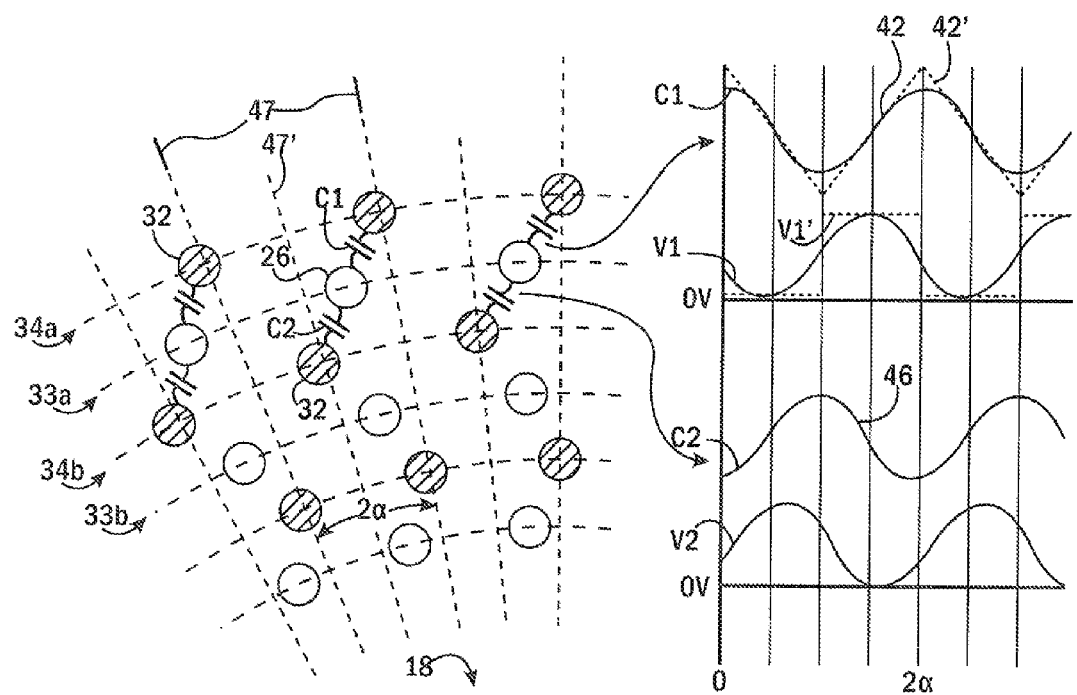
FIG. 3 is a cross-section taken along line 3-3 of FIG. 2 showing overlap of the rotor and stator pegs together with a plot of a capacitance profile showing mutual capacitance between the two with rotation of the rotor and two possible driving voltages in solid and dotted lines.

Referring now to FIG. 3, in this embodiment, the stator pegs 32 in each stator row 34, at a given constant radius with respect to the axis 18, may be aligned along radius lines 47 at equal angular spacing of 2α. Every other stator row 34 of stator pegs 32, as one moves radially, may be offset in angle from the previous row by α. As noted before, every other stator row 34 connects to a different conductor 36a or 36b. The rotor pegs 26 may also be spaced in rows 33 of constant radius about axis 18 positioned approximately halfway between the rows 34. The rotor pegs 26 may also have an equal angular spacing of 2α and are aligned along rotor lines 47'.

Generally, as a given rotor peg 26' moves in rotation past a first stator row 34a of stator pegs 32, the given rotor peg 26' experiences a mutual capacitance with proximate stator pegs 32 such that the total mutual capacitance between all rotor pegs 26 of a given rotor row 34 and the adjacent stator pegs 32 of stator row 34a (and electrically connected stator rows 34) provide a value $C_1$ that changes with rotational angle. This change in $C_1$ will be termed a capacitive profile and is shown by plotted waveform 42. With the described angular spacing of rotor pegs 26 and stator pegs 32, the periodicity of waveform 42 will be 2α with peak values of capacitance $C_1$ when rotor pegs 26 are aligned radially with stator pegs 32. The torque caused by electrostatic attraction between rotor pegs 26 and stator pegs 32 of stator row 34 will be a function of a product of the rate of change of the capacitance $C_1$ and the square of the applied voltage to stator pegs 32. Accordingly, a voltage waveform $V_1$ applied to stator pegs 32 will desirably have a nonzero magnitude (including a peak value) during the positive slope of $C_1$ and a low or zero magnitude during the negative slope of $C_1$ (where the resultant torque would be negative and hence counterproductive). A highest average torque is obtained, when the highest values in the driving voltage are aligned with the highest positive derivative of $C_1$.

When waveform 42 of $C_1$ is approximately sinusoidal and a sinusoidal driving power is used, maximum average torque is provided using a sinusoidal voltage $V_1$ with the phase lag of 90 degrees (α/2) with respect to waveform 42.

Insofar as sinusoidal voltages/currents may be readily obtained for motor driving, a sinusoidal capacitive profile of waveform 42 may be desirably promoted. This capacitive profile is encouraged by matching compact rotor pegs 26 and stator pegs 32 as opposed to having one set of pegs extend at substantial width along the circumferential direction such as would tend to promote a trapezoidal waveform 42 providing sections of constant capacitance $C_1$ such as would promote zero torque.

Similarly, if capacitance profile waveform 42 were triangular, as indicated by waveform 42', a square wave voltage signal $V_1'$ would provide the highest average torque. Such a square wave can be produced by solid-state switching devices gating a DC voltage/current source.

Note that in both cases the alternating waveform of voltage of $V_1$ or $V_1'$ is given a DC offset, i.e. it is a DC value with AC component riding on it. The DC voltage provides a nonzero electrical field and induces electrostatic charge separation in the floating rotor pegs 26. In another embodiment to be discussed below where direct electrical connection may be had by the rotor pegs 26, this induced field is not required. The magnitude of the voltage may be reduced to zero by the AC component at certain points when negative torque would otherwise be generated.

Referring still to FIG. 3, the present invention provides a second stator row 34b of stator pegs 32 staggered with respect to the first stator row 34a of stator pegs 32 on the rotor disk 24 and positioned to generate a peak torque when the torque produced by stator pegs 32 of first stator row 34a is lowest thus also providing improved torque consistency. In this case, a waveform 46 of capacitance $C_2$ provides a 180-degree phase relationship with respect to the waveform 42 of capacitance $C_1$, and similarly a voltage $V_2$ with a 180 degrees phase relationship with respect to voltage $V_1$ may be advantageously applied to conductor 36b and stator pegs 32 of stator row 34b.

Figure 7:
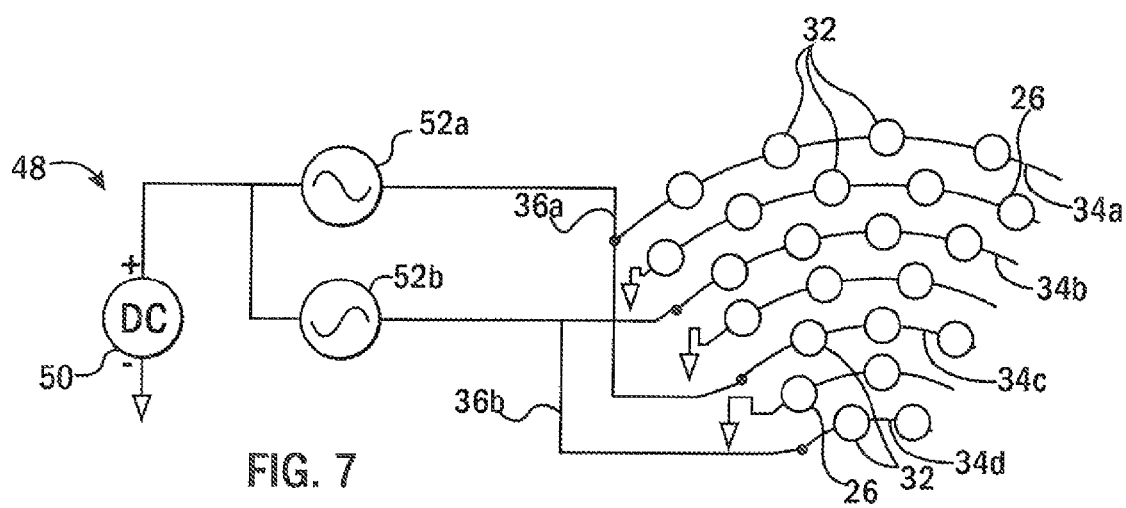
FIG. 7 is a simplified schematic of a power supply for the embodiment of FIG. 3.
Figure 8:
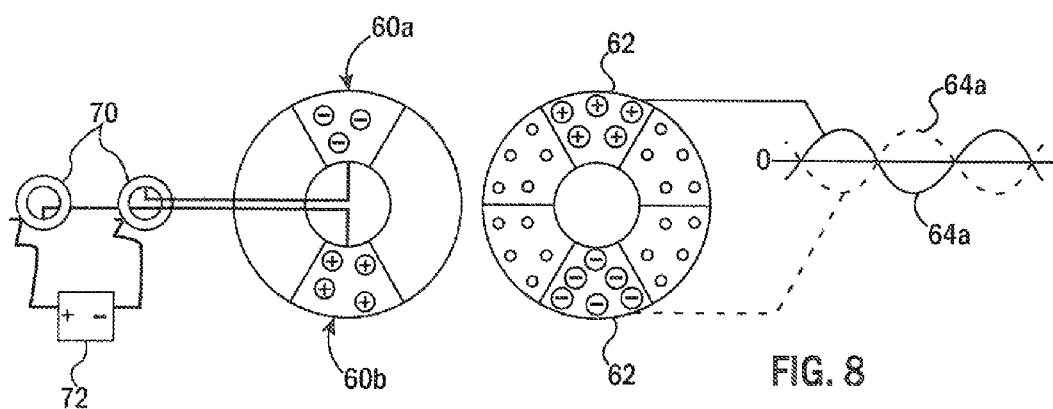
FIG. 8 is a simplified representation of slip rings providing electrical voltage to the rotor of FIG. 4 for improved torque through charge injection.

Referring momentarily to FIG. 7, a power source 48 producing the desired waveforms may employ a DC power supply 50 placed in series with two AC power supplies 52a and 52b, each of these latter AC power supplies 52a and 52b producing identical sinusoidal (square wave) output voltages with 180-degree respective phase difference. These AC power supplies 52a and 52b may be easily implemented by using two independent secondary windings of transformers having a common primary AC input and wiring the two secondaries with opposite polarity.

The AC power supplies 52a and 52b may connect with conductors 36a and 36b, respectively. The return or ground side of DC power supply 50 may be held at the same potential as the rotor pegs 26, for example, by a brush connection or the like.

Figure 4:
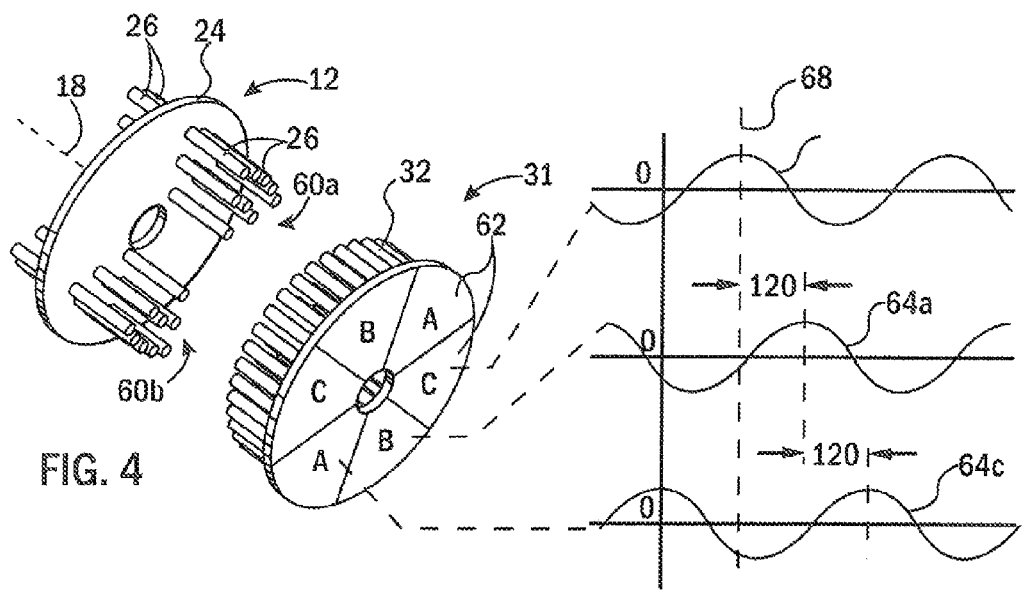
FIG. 4 is a figure similar to that of FIG. 1 showing a rotor and one stator in isolation in a three-phase embodiment with isolated clusters of rotor pegs, also showing a three-phase driving voltage.
Figure 5:
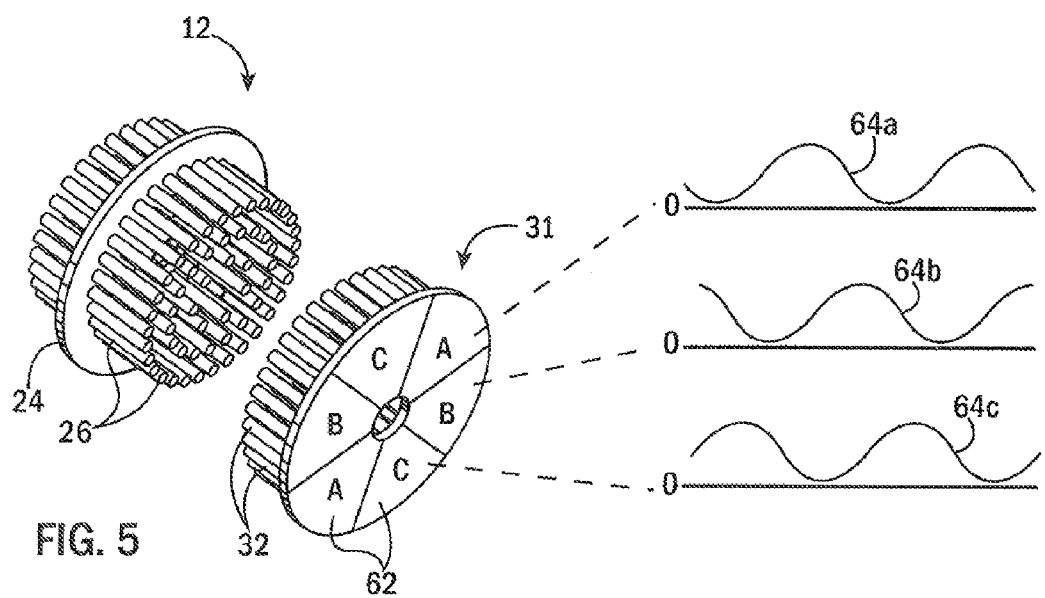
FIG. 5 is a figure similar to that of FIG. 4 showing a three-phase embodiment with a continuous angular range of rotor pegs.

Referring now to FIG. 4, in an alternative embodiment, the rotor pegs 26 of the rotor 12 may be collected into isolated clusters, for example, angularly opposed rotor clusters 60a and 60b each spanning in this depiction approximately 60 degrees of angular range about axis 18. In contrast, the stator pegs 32 may still provide a full angular range of 360 degrees about axis 18 but in this case are electrically connected together to form similar sized stator clusters 62, the stator pegs 32 of each stator cluster 62 communicating with each other but isolated from adjacent stator clusters. So, for example, six stator clusters 62 may be developed each having an angular range of 60 degrees and distributed in sequence about the axis 18. Stator clusters 62 in opposition may be electrically connected together to provide three electrically independent stator clusters 62 labeled A, B, and C.

Each of these stator clusters 62 of A, B, and C may be provided with a different voltage waveform 64a-64c being, for example, different phases of three-phase electrical power providing sinusoidal voltages having a 120 degrees phase difference with the other phases. It will be understood that this connection creates a rotating electrical vector about axis 18 that will apply a corresponding rotational torque to the rotor clusters 60a and 60b. In effect, as the rotor spins, a rotating capacitance wave is also created such that the capacitance rises and fall among the phases. The capacitance and voltage waves must be synchronized. The angle between the rotating waves controls the power/torque output, much as in rotating electromagnetic machinery.

It will be appreciated that the stator clusters 62 need not extend a full 60 degrees as shown but, instead, may extend by as much as 120 degrees for a single stator cluster 62 with a corresponding increase in the size of rotor clusters 60 or conversely may be broken into multiple smaller stator cluster sizes, for example, of 30 degrees, 10 degrees, or even to individual stator radius lines 47. In all cases the stator clusters 62 alternate A, B, C electrical connections. A larger number of stator clusters 62 and rotor clusters 60 will produce a slower motor speed and more uniform motor torque for a given frequency of waveforms 64. As before, the size and numbers of the stator clusters 62 and rotor clusters 60 are matched to accomplish desired operating characteristics. More generally, the angular range of the rotor cluster 60 may be larger than the angular range of the stator cluster 62, for example, being 90 degrees for the rotor cluster 60 and 60 degrees for the stator clusters 62. This allows for a transition from one phase to another that provides an improved capacitance profile.

Figure 6:
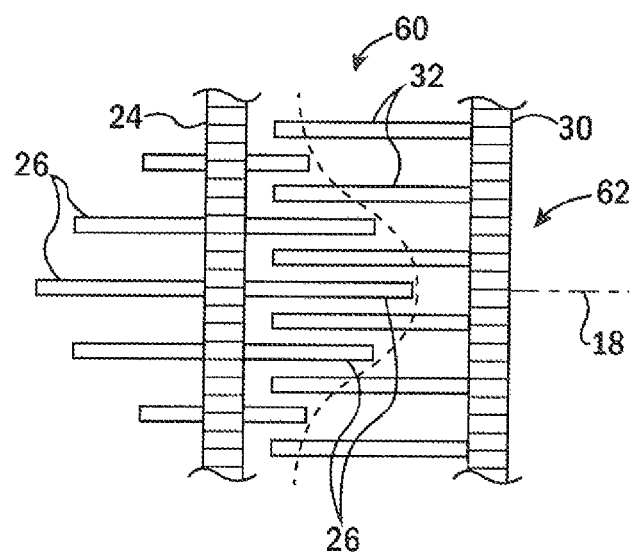
FIG. 6 is a top fragmentary view of overlapping rotor pegs and stator pegs of FIG. 4 showing variation in length of rotor pegs for tailoring the capacitive profile.

Referring now to FIG. 6, the rotor pegs 26 of each rotor cluster 60 may be given different axial lengths to modify the capacitive profile exhibited as the cluster 60 moves through the stator pegs 32 of a given cluster 62. This modification of the rotor pegs 26 may be done to better match the capacitive profile to the driving waveform, for example, to make it more sinusoidal or more triangular. Alternatively, or in addition, the same modification could be done with the stator pegs 26.

Figure 10:
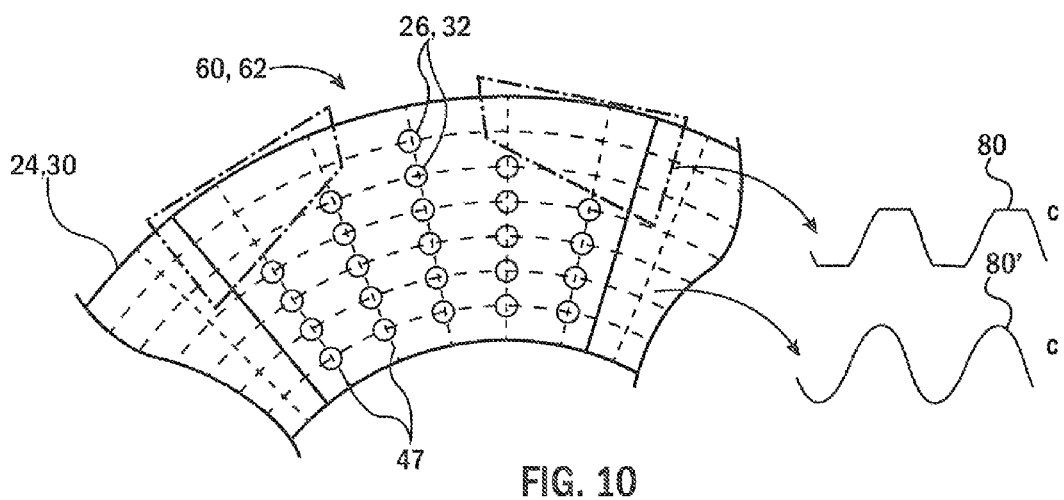
FIG. 10 is a fragmentary elevational view of pins extending from one of the rotor or stator showing a depopulation of some pins to provide improved capacitive profile.

Referring now to FIG. 10, the pegs 26 or 32 of either the rotor 12 or stator 31 may further have their length essentially reduced to zero to modify the capacitive profile exhibited between clusters 60 or 62 as they pass each other. In this case, pegs 26 or 32 at the peripheral outer edges of radial lines 47 at the leading and trailing side of the clusters 60 and 62 are progressively remove removed as one moves away from a center of the cluster to smooth a trapezoidal capacitive profile waveform 80 between clusters 60 and 62 to a more sinusoidal capacitive waveform 80. This technique which emphasizes not only length but location may be combined with a nonzero varying lengths of pegs 26 or 32

Although the rotor pegs 26 of the rotor clusters 60 may be electrically floating on an insulating rotor disk 24, in one embodiment slip rings 70 may be provided so that a DC bias from a DC power source 72 may be applied across, for example, opposite rotor clusters 60a and 60b providing them with a net charge that will be attracted to opposite charges applied to the stator clusters 62. In this case the opposite stator clusters 62 may also be given different polarities, for example, by providing waveform 64a to a first stator cluster 62 and having waveform 64a' be 180 degrees out of phase with waveform 64a to an opposite stator cluster 62. This ability to provide for repulsive as well as attractive forces between rotor pegs 26 and stator pegs 32 raises the possibility of bipolar operation with appropriate phasing of the clusters 62.

Figure 9:
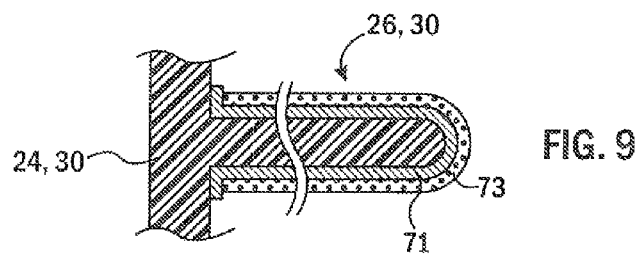
FIG. 9 is a fragmentary cross-section of one rotor or stator peg taken along an axial plane showing use of a conductive coating on an insulating material.

Referring now to FIG. 9, each of the rotor pegs 26 and stator pegs 32 need not be fully conductive but only require an outer conductive surface that can support the necessary electrical charge. Accordingly, the rotor pegs 26 and stator pegs 32 may be, for example, constructed of injection-molded thermoplastic being electrically insulating and having a high electrical breakdown. This insulating core may be coated with a conductive layer 71, for example, by sputtering or electroplating with a conductive metal such as copper, aluminum, or nickel. The conductive layer 71 may be in turn coated with an insulating material 73 which may also provide a high dielectric constant. Examples of such include titanium dioxide ($TiO_2$) having a dielectric constant $\in_r$ of greater than 80 or barium titanate ($BaTiO_3$) having a dielectric constant $\in_r$ of greater than 1500. Electrode materials may also be incorporated into the rotor pegs 26 and stator pegs 32.

The dielectric fluid 38 may include ferroelectric particles for enhanced permittivity.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will be generally understood that the electrical machines described herein may be operated either as motors or generators and in the latter case that the tailoring of the capacitive profile may be done to provide a desired output waveform.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electrostatic machine comprising:
   a housing;
   an axle extending along an axis and supported on the housing for rotation about the axis;
   at least one rotor element attached to the axle to rotate therewith and providing a plurality of axially extending rotor pegs;
   at least one stator element substantially fixed with respect to the housing and providing a plurality of axially extending stator pegs moving between the rotor pegs in interdigitated fashion with rotation of the rotor;
   a high dielectric fluid retained within the housing to surround the rotor pegs and stator pegs, the high dielectric fluid providing a breakdown strength of at least 5,000 volts per millimeter; and
   wherein at least one of the rotor and stator pets comprise an insulating support structure having a conductive metal coating.

2. The electrostatic machine of claim 1 wherein the high dielectric fluid provides a relative permittivity of greater than five.

3. The electrostatic machine of claim 1 wherein the rotor pegs and stator pegs have a substantially constant cross-sectional diameter measured in a plane perpendicular to the axis.

4. The electrostatic machine of claim 3 wherein the rotor pegs and stator pegs are circular in cross-section.

5. The electrostatic machine of claim 1 wherein the rotor pegs and stator pegs are configured to provide a varying mutual capacitance whose derivative matches a respective of a first and second waveform providing power to the rotor and stator pegs.

6. The electrostatic machine of claim 1 wherein at least one of the rotor and stator pegs are coated with a material with a high dielectric constant of greater than ten.

7. The electrostatic machine of claim 1 wherein at least one of the rotor and stator pegs provides an insulating core with a conductive metal coating.

8. The electrostatic machine of claim 1 wherein the stator pegs include a first, second, and third set of stator pegs in electrical communication with other pegs of a given set and isolated from pegs other than the given set, wherein the pegs of the first, second, and third sets are arranged angularly about the axis and further including an electrical power supply providing a first, second, and third waveform to the first, second, and third sets respectively where the first, second, third wave forms are at different electrical phases.

9. The electrostatic machine of claim 8 wherein each set of rotor pegs includes spatially separated clusters of multiple electrically interconnected angularly spaced rotor pegs that are electrically isolated from the rotor pegs of adjacent clusters.

10. The electrostatic machine of claim 8 wherein the pegs on at least one of the rotor and stator have a varying axial length among different pegs of the row and stator.

11. The electrostatic machine of claim 8 further including slip rings for providing a direct electrical power connection to the rotor pegs.

12. The electrostatic machine of claim 8 wherein the rotor pegs and stator pegs are configured to provide a varying mutual capacitance whose derivative matches a respective of the first, second and third waveform providing power to the rotor and stator pegs.

13. The electrostatic machine of claim 8 wherein the rotor pegs and stator pegs are circular in cross-section.

14. The electrostatic machine of claim 8 wherein the pegs are coated with a material with high dielectric constant of greater than ten.

15. The electrostatic machine of claim 8 wherein at least one of the rotor and stator provides an insulating substrate with a conductive metal coating.

16. An electrostatic machine comprising:
a housing;
an axle extending along an axis and supported on the housing for rotation about the axis;
at least one rotor element attached to the axle to rotate therewith and providing a plurality of axially extending rotor pegs;
at least one stator element substantially fixed with respect to the housing and providing a plurality of axially extending stator pegs moving between the rotor pegs in interdigitated fashion with rotation of the rotor; and
a high dielectric fluid retained within the housing to surround the rotor pegs and stator pegs, the high dielectric fluid providing a breakdown strength of at least 5,000 volts per millimeter;
wherein the stator pegs include a first and second set of stator pegs, the pegs of each given set in electrical communication with other pegs of the given set and isolated from pegs other than the given set, wherein the pegs of the first and second sets are arranged in radially extending rows and concentric circles and wherein the radially extending rows of the first set of stator pegs are interleaved with the radially extending rows of the second set of stator pegs but angularly offset from the radially extending rows of the second set of stator pegs.

17. The electrostatic machine of claim 16 wherein the rows of the first set of stator pegs are angularly positioned halfway between the rows of the second set of stator pegs further including an electrical power supply providing a first and second waveform to the first and second sets respectively where the first and second waveforms are substantially 180 degrees out of phase.

18. An electrostatic machine comprising:
a housing;
an axle extending along an axis and supported on the housing for rotation about the axis;
at least one rotor element attached to the axle to rotate therewith and providing a plurality of axially extending rotor pegs;
at least one stator element substantially fixed with respect to the housing and pro viding a plurality of axially extending stator pegs moving between the rotor pegs in interdigitated fashion with rotation of the rotor;
a high dielectric fluid retained within the housing to surround the rotor peas and stator pegs, the high dielectric fluid providing a breakdown strength of at least 5,000 volts per millimeter;
wherein the stator pegs include a first, second, and third set of stator peg in electrical communication with other pens of a given set and isolated from pegs other than the given set, wherein the pegs of the first, second, and third sets are arranged angularly about the axis and further including an electrical power supply providing a first, second, and third waveform to the first, second, and third sets respectively where the first, second, third wave forms are at different electrical phases;
wherein at least one of the set of rotor pegs and stator pegs are arranged in circumferential rows having a varying angular spacing about the axis.

* * * * *